(12) United States Patent
Mougin et al.

(10) Patent No.: US 9,444,299 B2
(45) Date of Patent: Sep. 13, 2016

(54) SPACER FOR STABILIZING AND INSULATING AN END WINDING

(71) Applicant: ETEL S.A., Moetiers (CH)

(72) Inventors: Guillaume Mougin, Charquemont (FR); Christophe Dehouck, Doubs (FR); David Panet, Neuchatel (CH)

(73) Assignee: Etel S.A., Motiers (CH)

( * ) Notice: Subject to any disclaimer, the term of this patent is extended or adjusted under 35 U.S.C. 154(b) by 343 days.

(21) Appl. No.: 14/047,331

(22) Filed: Oct. 7, 2013

(65) Prior Publication Data

US 2014/0097710 A1    Apr. 10, 2014

(30) Foreign Application Priority Data

Oct. 8, 2012    (EP) .................................... 12187570

(51) Int. Cl.
*H02K 3/38*    (2006.01)

(52) U.S. Cl.
CPC ........................ *H02K 3/38* (2013.01)

(58) Field of Classification Search
CPC .............................. H02K 3/487; H02K 3/38
USPC .......................... 310/214, 215, 43, 260, 270
See application file for complete search history.

(56) References Cited

U.S. PATENT DOCUMENTS

| | | | |
|---|---|---|---|
| 3,457,442 A | 7/1969 | Charlton et al. | |
| 3,575,623 A | 4/1971 | Stine | |
| 4,335,325 A * | 6/1982 | Miller | H02K 15/105 310/214 |
| 4,403,162 A * | 9/1983 | Pallaro | H02K 3/38 310/194 |
| 5,270,603 A * | 12/1993 | Narumi | H02K 3/50 310/214 |
| 5,642,013 A | 6/1997 | Wavre | |
| 5,659,219 A | 8/1997 | Momose et al. | |
| 5,821,649 A * | 10/1998 | Langhorst | H01R 13/6485 310/214 |
| 6,043,584 A | 3/2000 | DeHart | |
| 7,132,776 B2 * | 11/2006 | Tagami | H02K 3/38 310/194 |
| 2002/0070621 A1 * | 6/2002 | Mori | H02K 3/30 310/215 |
| 2004/0070302 A1 * | 4/2004 | Parker | B60T 8/363 310/194 |
| 2005/0057106 A1 * | 3/2005 | Allen | H02K 9/22 310/54 |
| 2009/0091206 A1 * | 4/2009 | Nissen | H02K 3/38 310/215 |

FOREIGN PATENT DOCUMENTS

GB    2 288 920    11/1995

OTHER PUBLICATIONS

European Search Report, dated Mar. 15, 2013, issued in corresponding European Patent Application No. 12187570.2.

* cited by examiner

*Primary Examiner* — Naishadh Desai

(74) *Attorney, Agent, or Firm* — Kenyon & Kenyon LLP

(57) ABSTRACT

A spacer for mechanically stabilizing and electrically insulating an end winding in an electric motor includes an elastic nose having a free end. A planar, electrically insulating sheet is integrally formed at an end of the nose located opposite the free end. Such spacers are used in an electric motor having an iron core, whose teeth are surrounded by coils whose end windings laterally project from the iron core. The spacers are press-fitted inside openings formed by the end windings and the teeth, so that the end windings are covered by the sheet of the press-fitted spacer in the direction of an air gap of the electric motor in each case.

22 Claims, 1 Drawing Sheet

SPACER FOR STABILIZING AND INSULATING AN END WINDING

CROSS-REFERENCE TO RELATED APPLICATIONS

The present application claims priority to Application No. 12187570.2, filed in the European Patent Office on Oct. 8, 2012, which is expressly incorporated herein in its entirety by reference thereto.

FIELD OF THE INVENTION

The present invention relates to a spacer for the mechanical stabilization and electrical insulation of an end winding in an electric motor, and to an electric motor having such a spacer.

BACKGROUND INFORMATION

Permanently excited synchronous motors are described in U.S. Pat. No. 5,642,013. In addition to a particular ratio between the spacing of the teeth of the primary component and the spacing of the magnets of the secondary component that leads to a reduced cogging torque, the straight tooth flanks, in particular, are considered advantageous. They make it possible to slip the coils of the primary component in prefabricated form onto the individual teeth of the primary component. In so doing, attention should be paid to satisfactory insulation of the coils from the teeth of the iron core and from the air gap of the motor.

It is conventional to line the teeth gaps (i.e., the grooves of the iron core) with insulating paper or to wind such paper around the straight regions of the coils. The end windings of the coils laterally projecting from the iron core are sheathed in a casting compound (synthetic resin) for mechanical stabilization and electrical insulation. It is also conventional to press an elastic spacer having a tapering free end into the opening that is formed by an end winding and a tooth, which not only imparts additional mechanical stability to the end winding, but also provides electrical insulation between the end winding and tooth. This is of particular importance in this region, because it is quite difficult to insert insulating paper into the curved region of the coil. Using such spacers at both opposite end windings of a coil also centers and fixates the coil around the tooth.

To improve the insulation of the end windings from the air gap of the motor, it is conventional to place a sheet of insulating material in front of the end windings, which subsequently is encapsulated in resin together with the end windings.

The production process for such a motor and in particular the mechanical stabilization and electrical insulation of the end windings thus is relatively complex.

SUMMARY

Example embodiments of the present invention simplify the production process, especially by providing a spacer for the end windings of such a motor, as described herein.

A spacer is described herein for mechanically stabilizing and electrically insulating an end winding in an electric motor, which has an elastic nose provided with a free end. A planar, electrically insulating sheet is integrally formed at an end of the nose disposed opposite the free end.

Such spacers may be used in an electric motor having an iron core, whose teeth are surrounded by coils whose end windings laterally project from the iron core. The spacers are pressed into openings formed by the end windings and the teeth, so that the end windings are covered by a sheet of the press-fitted spacer in the direction of an air gap of the electric motor.

With the aid of the spacers described herein, the coils of the electric motor are mechanically stabilized and electrically insulated in the direction of the air gap of the electric motor as well, this being accomplished in a single working step.

Further features and aspects of example embodiments of the present invention are described in more detail below with reference to the appended Figures.

DETAILED DESCRIPTION

Figure 1:
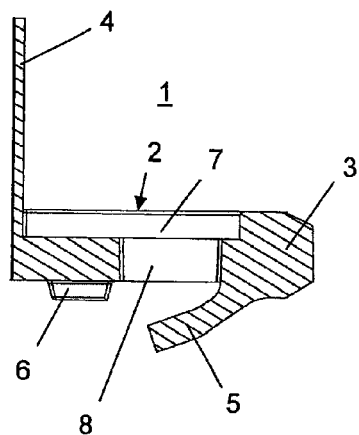
FIG. 1 is a cross-sectional view through a spacer.
Figure 2:
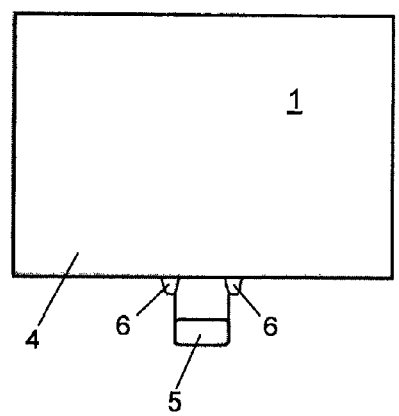
FIG. 2 is a front view of the spacer illustrated in FIG. 1.
Figure 3:
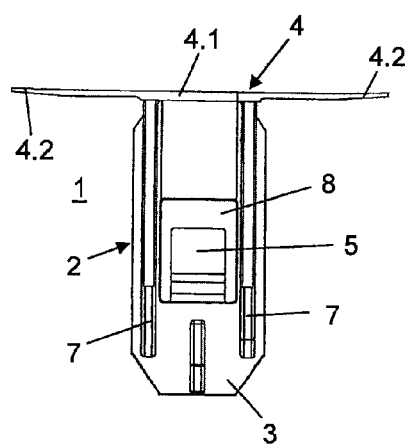
FIG. 3 is a top view of the spacer illustrated in FIG. 1.

FIGS. 1 to 3 illustrate a spacer 1 according to an example embodiment of the present invention in various representations. FIG. 1 is a side cross-sectional view through spacer 1, the cross-sectional plane extending through nose 2 of spacer 1. Spacer 1 is symmetrical with respect to this cross-sectional plane. FIG. 2 is a front view of sheet 4 of spacer 1, and FIG. 3 is a top view of spacer 1.

Elastic nose 2 with its taper toward its free end 3, which later is used to insert spacer 1 into the end winding of an electric motor, is illustrated in FIGS. 1 to 3. The tapers noticeable at free end 3 facilitate the insertion. A planar, electrically insulating sheet 4 is integrally formed at an end of nose 2 located opposite free end 3.

Spacer 1 is provided in one piece as an injection-molded part. It is made of a polyamide, for example, which not only has excellent electrically insulating properties but also provides a certain elasticity.

In order to enhance the elasticity of this material, nose 2 has a projecting elastic tab 5 on its underside, which is bent in the direction of nose 2 when spacer 1 is pushed in, and which retains spacer 1 in the end winding of the electric motor by its spring force.

In addition, nose 2 has raised fillets 6 and 7 on its underside and topside. Raised fillets 6 restrict the compression of tab 5, because tab 5 is not compressed further when nose 2 is pressed into the end winding once raised fillets 6 make contact with the iron core or the end winding. This prevents tab 5 from breaking off.

In conjunction with a through opening 8 in nose 2, which connects the underside of nose 2 to its topside, raised fillets 6, 7 also ensure that during a subsequent encapsulation of the primary component in resin, this resin will also be able to penetrate the openings of end windings 11 and flow around nose 2. This prevents air bubbles from forming in the electrical insulation of the motor. Such air bubbles are quite detrimental because air having a dielectric strength of 3 kV/mm insulates much more poorly than an epoxy resin at 19 kV/mm normally used for encapsulating a motor.

As illustrated in FIG. 3, for example, sheet 4 is thicker in a middle region 4.1 having nose 2 than in its edge regions 4.2. Edge regions 4.2 likewise have a thickness that tapers steadily towards the edge. A sheet 4 arranged in this manner not only has the stability required in the region of nose 2, but also is so flexible that it is able to adapt to different radii of rotatory electric motors. Sheets 4 whose middle region 4.1 has a thickness of approximately 0.5 to 1 mm are particularly advantageous, while the thickness of the sheet decreases to 0.1 to 0.2 mm toward the edge.

In addition, sheet 4 is roughened on the side facing away from nose 2, the roughness corresponding to a Charmilles roughness index of 38, for example. This makes it possible to achieve better adhesion between the resin and sheet 4 during the subsequent encapsulation of the motor in resin. This is important because the resin layer on this side facing the air gap of the motor is only very thin.

Figure 4:
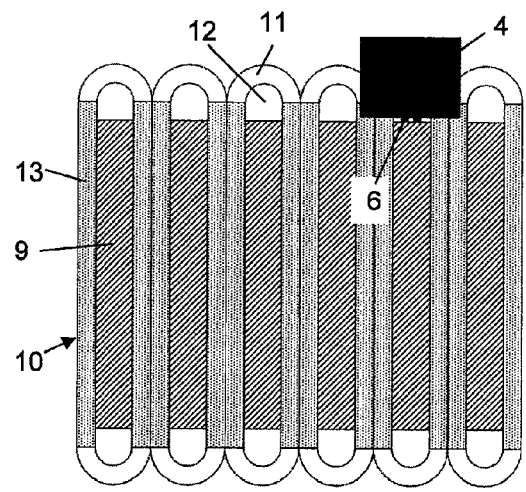
FIG. 4 illustrates a primary component of an electric motor.

FIG. 4 illustrates a primary component of an electric motor, as described above. Teeth 9 of an iron core around which coils 10 are wound are visible. End windings 11 project laterally from the iron core and thus form openings 12 into which spacers 1 are inserted.

The straight regions of coils 10 located between teeth 9 are enveloped by an insulating paper 13. However, it is quite difficult to insulate end windings 11, which is why this task is assumed by spacers 1, one of which is illustrated in the inserted state in FIG. 4. Next to sheet 4, which insulates an end winding 11 from the air gap of the electric motor, both raised fillets 6 are visible on the underside of nose 2. These raised fillets 6 ensure that resin is able to penetrate opening 12 underneath sheet 4 and flow around nose 2 during the encapsulation of the motor. As a result, nose 2 is embedded in resin following the encapsulation process, the resin being located between raised fillets 6 and 7 and in through opening 8 of nose 2.

As illustrated in FIG. 4, sheets 4 of adjacent spacers 1 also overlap, so that an insulation of end windings 11 from the air gap of the motor is ensured.

Because of the overlap of sheets 4 and their flexibility, such spacers 1 are able to be used for various motor geometries, without any need to produce individual spacers for each type of motor. Spacers 1 are suitable for linear motors and also for rotary motors having different radii.

What is claimed is:

1. A spacer for mechanically stabilizing and electrically insulating an end winding in an electric motor, comprising:
    an elastic nose having a free end; and
    a planar, electrically insulating sheet integrally formed at an end of the nose located opposite the free end;
    wherein the nose includes a projecting, elastic tab elastically bendable in a direction of the nose, the tab adapted to retain the spacer in the end winding by a spring force.

2. The spacer according to claim 1, wherein the free end of the nose tapers.

3. The spacer according to claim 1, wherein the spacer is arranged as a one-piece, injection-molded part.

4. The spacer according to claim 1, wherein the spacer is formed of polyamide.

5. The spacer according to claim 1, wherein the nose includes raised fillets and at least one through opening.

6. The spacer according to claim 1, wherein the sheet is thicker in a center region having the nose than in edge regions.

7. The spacer according to claim 6, wherein the sheet has a steadily decreasing thickness in the edge regions.

8. The spacer according to claim 6, wherein the sheet has a thickness between 0.1 mm and 1 mm.

9. The spacer according to claim 1, wherein the sheet includes a roughening on a side facing away from the nose.

10. An electric motor, comprising:
    an iron core having teeth surrounded by coils, the coils having end windings that project laterally from the iron core;
    a spacer press-fitted into each opening formed by the end windings and the teeth, each spacer including:
        an elastic nose having a free end and a projecting, elastic tab elastically bendable in a direction of the nose, the tab retaining the spacer in the opening by a spring force against the end winding and/or the teeth; and
        a planar, electrically insulating sheet integrally formed at an end of the nose located opposite the free end;
    wherein the end windings are covered by the sheet of the press-fitted spacer with respect to an air gap of the electric motor.

11. The electric motor according to claim 10, wherein the sheets of two adjacent spacers overlap.

12. The electric motor according to claim 10, wherein the end windings and the spacers are enveloped by a casting compound.

13. An electric motor, comprising:
    an iron core having teeth surrounded by coils, the coils having end windings that project laterally from the iron core;
    a spacer press-fitted into each opening formed by the end windings and the teeth, each spacer including:
        an elastic nose having a free end; and
        a planar, electrically insulating sheet integrally formed at an end of the nose located opposite the free end;
    wherein the end windings are covered by the sheet of the press-fitted spacer with respect to an air gap of the electric motor;
    wherein the end windings and the spacers are enveloped by a casting compound; and
    wherein the casting compound envelops the noses to fill regions between raised fillets and through openings of the noses with the casting compound.

14. The electric motor according to claim 12, wherein the casting compound envelops the noses to fill regions between raised fillets and through openings of the noses with the casting compound.

15. The electric motor according to claim 10, wherein the free end of the nose tapers.

16. The electric motor according to claim 10, wherein the spacer is arranged as a one-piece, injection-molded part.

17. The electric motor according to claim 10, wherein the spacer is formed of polyamide.

18. The electric motor according to claim 10, wherein the nose includes raised fillets and at least one through opening.

19. The electric motor according to claim 10, wherein the sheet is thicker in a center region having the nose than in edge regions.

20. The electric motor according to claim 19, wherein the sheet has a steadily decreasing thickness in the edge regions.

21. The electric motor according to claim 19, wherein the sheet has a thickness between 0.1 mm and 1 mm.

22. The electric motor according to claim 10, wherein the sheet includes a roughening on a side facing away from the nose.

* * * * *